No. 683,460. Patented Oct. 1, 1901.
W. S. GOULD.
SYSTEM OF DISTRIBUTION.
(Application filed Jan. 31, 1901.)
(No Model.)

Witnesses.
J Green
Wm P Hammond

Inventor.
William S Gould
by Knight Bros.
atty

UNITED STATES PATENT OFFICE.

WILLIAM S. GOULD, OF NEW YORK, N. Y., ASSIGNOR TO GOULD STORAGE BATTERY COMPANY, OF SAME PLACE.

SYSTEM OF DISTRIBUTION.

SPECIFICATION forming part of Letters Patent No. 683,460, dated October 1, 1901.

Application filed January 31, 1901. Serial No. 45,413. (No model.)

*To all whom it may concern:*

Be it known that I, WILLIAM S. GOULD, a citizen of the United States, residing in the city, county, and State of New York, have invented certain new and useful Improvements in Systems of Distribution, of which the following is a specification.

This invention relates to improvements in systems of distribution wherein storage batteries are used to equalize the load on the dynamo or to serve as a source of energy at a time when the main generator or dynamo is not in operation.

The object of the invention is to provide a certain portion (the end cells) of the battery with charging means independent of the main generator and work-circuit, so that while the main dynamo is charging the main portion of the battery an independent dynamo is charging the end cells in an independent unconnected circuit. As the battery voltage changes, on account of charge or discharge thereof, end cells are cut into or out of connection, so as to maintain substantially constant the counter electromotive force presented by the battery to the main dynamo and work-circuit, and switching means are provided which on removing an end cell from the main-circuit connection transfer it to the independent-dynamo connection, so that the cell continues to be charged after it is disconnected from the main dynamo.

Figure 1:
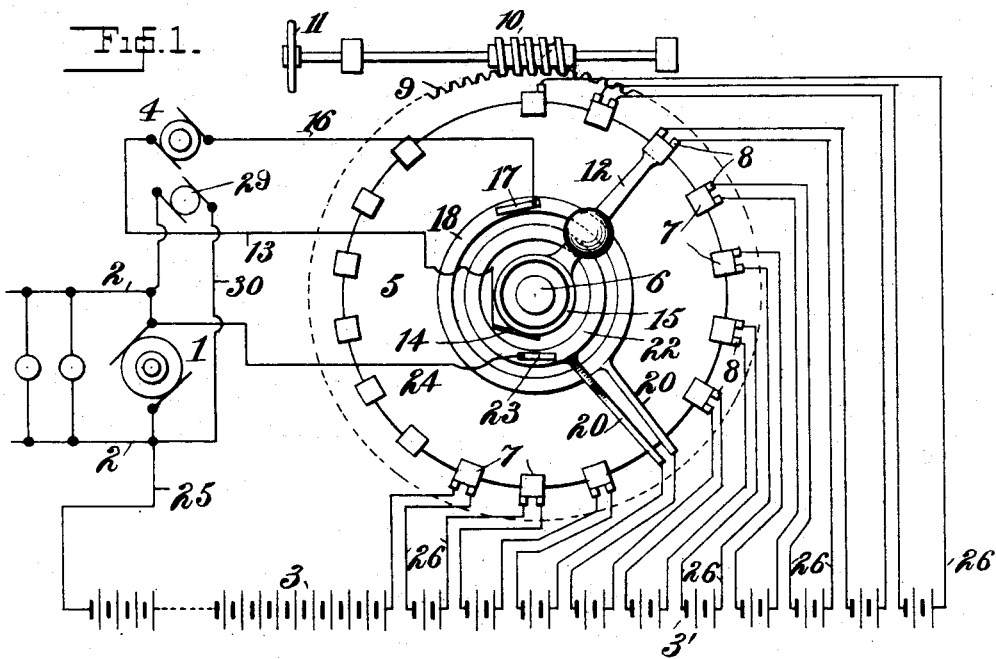
Figure 2:
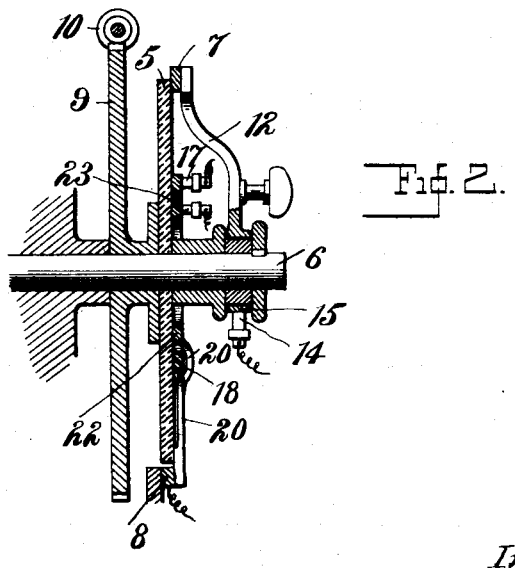

In the accompanying drawings, Figure 1 is a diagrammatic representation of a system of distribution embodying my invention; and Fig. 2 is a vertical section of the switch for transferring the end cells, as above described.

1 represents the main generator or dynamo; 2 2, the work-circuit connected thereto; 3, the storage battery with end cells 3', and 4 the independent generator. A switch is provided carrying an insulating-disk 5, mounted to turn on a stud 6, and carrying a circumferential series of contacts 7, which are adapted to engage fixed contacts 8 8, arranged in a series of pairs around the switch-disk 5. Means—such as a worm-wheel 9, attached to disk 5, and a worm 10, operated by handle 11—are provided for turning disk 5. An independent switch lever or arm 12 is mounted to turn on stud 6, and its outer end is adapted to ride over the switch-contacts 7.

The independent generator 4 is connected by wire 13, brush 14, and contact-ring 15 with the independent switch-lever 12 and by wire 16, brush 17, and contact-ring 18 with one of a pair of contacts 20 20, intercalated in the series of contacts 7, the other contact 20 being connected by contact-ring 22, brush 23, and wire 24 with one side of the generator and work-circuit. From the other side of the generator and work-circuit wire 25 leads to one end of the storage battery 3. At the other end of the battery are arranged the end cells or regulating-cells 3'. Each terminal of each end cell is connected by a wire 26 to one of a series of contacts 8 8, the contacts of each pair being connected to opposite terminals of adjacent cells. Switch-disk 5 being placed so that contacts 7 bridge the contacts 8 8, circuit will be completed from each end cell to the next, except where the contacts 20 20 occur, these contacts splitting the circuit and making connection from one end cell terminal to one side of the independent generator-circuit and from the adjacent end cell to one side of the work-circuit. These circuits may be traced as follows: The main circuit leads from generator 1, through wire 25, to one end of storage battery, out through a number of end cells, (depending on the position of disk 5,) and then by wire 26 and contact 8 to a contact 20, thence by contact-ring 22, brush 23, and wire 24 back to the dynamo. The independent circuit leads from the independent generator 4, by wire 13, brush 14, and ring 15, to switch-arm 12, one of the contacts 7, and a contact 8 to one of the end cells, through a number of such end cells in series, (depending on the positions of the switch 12 and disk 5,) until the cell is reached that at that time is in connection by a wire 26 and contact 8 with the other contact 20, through such contact 20, ring 18, brush 17, and wire 16 to the other side of the independent generator. This may be assumed to be the condition during charging with the dynamo 1 charging the main storage battery 3 and so many of the end cells 3' as may be included in this circuit by switch-contacts 20, 8 and 12, 7, 8 in the charging-circuit, energized by independent charging-dynamo 4, and the number of cells so included may be regulated by means of switch 12. As the battery increases in potential in charging regulating-cells 3' are cut out from the main dynamo-circuit by turning the switch-disk 5, and such regulating-cells are by the same movement transferred to the circuit of the independent generator 4, so as to continue the charging thereof. When the main dynamo is shut down or ceases to operate, the switch-disk 5 would be turned around to throw additional end cells into the working circuit 2 and maintain the proper working potential. The independent generator may also be shut down at such time, this system being primarily intended for separate installations with no violent load fluctuations and the battery alone being capable of maintaining proper electromotive force.

The independent generator is driven by a suitable source of power, preferably a motor 29, energized by connection 30 from the main generator 1 and from the main battery 3. Thus, if so desired, the battery 3' in the independent circuit may be charged by a motor-generator energized by the main battery.

Having thus described my invention, the following is what I claim as new therein and desire to secure by Letters Patent:

1. In a system of distribution, the combination with a main generator and storage battery and work-circuit connected thereto, of an independent generator and switching means for transferring cells of the storage battery from the circuit of the main generator to the circuit of the independent generator while maintaining the said two circuits in disconnected relation.

2. In a system of distribution, the combination with a main generator and storage battery and a work-circuit connected thereto, of an independent generator and a switch comprising contacts connected to some of the cells of the battery and other contacts connected to the main and independent generator and adapted to place a variable number of said cells in the circuit of the main generator, and a variable number of other cells in connection with the independent generator.

3. In a system of distribution, the combination with a main generator and storage battery and a work-circuit connected thereto, of an independent generator and switching means for transferring cells of the storage battery from the circuit of the main generator to the circuit of the independent generator while maintaining the said two circuits in disconnected relation, and a switching device adapted to control the number of cells included in the independent generator, irrespective of the number of cells transferred from the circuit of the main generator.

4. The combination with a main battery, a battery in a circuit independent of the main battery, a generator in said independent circuit to charge the battery therein, and a motor driving said generator and energized by connection with the main battery.

5. The combination with the main generator, a battery in a circuit independent of the main generator, an independent generator in said independent circuit to charge the battery therein, and a motor driving said independent generator and energized by connection with the main generator.

WILLIAM S. GOULD.

Witnesses:
A. S. HUBBARD,
THOS. J. FAY.